(12) United States Patent
Nakamura et al.

(10) Patent No.: US 10,705,770 B2
(45) Date of Patent: Jul. 7, 2020

(54) COMPUTER-READABLE MEDIUM, INFORMATION PROCESSING DEVICE, AND METHOD FOR CUSTOMIZING A SCREEN TO BE DISPLAYED ON A DISPLAY APPARATUS

(71) Applicant: BROTHER KOGYO KABUSHIKI KAISHA, Nagoya-shi, Aichi (JP)

(72) Inventors: Tomoki Nakamura, Kasugai (JP); Eriko Takahashi, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/362,812

(22) Filed: Mar. 25, 2019

(65) Prior Publication Data

US 2019/0303052 A1 Oct. 3, 2019

(30) Foreign Application Priority Data

Mar. 30, 2018 (JP) .................. 2018-067436

(51) Int. Cl.
*G06F 3/12* (2006.01)
*G06F 3/0486* (2013.01)
*H04N 1/00* (2006.01)

(52) U.S. Cl.
CPC .......... *G06F 3/1204* (2013.01); *G06F 3/0486* (2013.01); *G06F 3/1234* (2013.01); *H04N 1/00411* (2013.01); *H04N 1/00506* (2013.01)

(58) Field of Classification Search
None
See application file for complete search history.

(56) References Cited

U.S. PATENT DOCUMENTS 6,002,402 A * 12/1999 Schacher .............. G06F 3/0481
715/810
8,296,728 B1 * 10/2012 Webster .............. G06F 3/04886
717/109
(Continued)

FOREIGN PATENT DOCUMENTS

EP        3253041 A1 * 12/2017  ......... H04N 1/00413
JP        2011-154474 A     8/2011
(Continued)

*Primary Examiner* — Ted W Barnes
(74) *Attorney, Agent, or Firm* — Scully, Scott, Murphy & Presser, PC

(57) ABSTRACT

A non-transitory computer-readable medium stores computer-readable instructions executable by a processor coupled with an information processing device including a display, an input interface, and a communication interface, the instructions causing the processor to control the display to display a first customizing screen, in response to a particular type of object on the first customizing screen being selected via the input interface, control the display to display a second customizing screen that is associated with the particular type of object and in a layer one-level lower than the first customizing screen in a screen hierarchy, accept, via the input interface, an operation of moving a target object between the first customizing screen and the second customizing screen, and transmit, to a display apparatus via the communication interface, screen data representing the first customizing apparatus and the second customizing apparatus between which the target object has been moved by the accepted operation.

10 Claims, 12 Drawing Sheets

(56) References Cited

U.S. PATENT DOCUMENTS

Figure 2A:
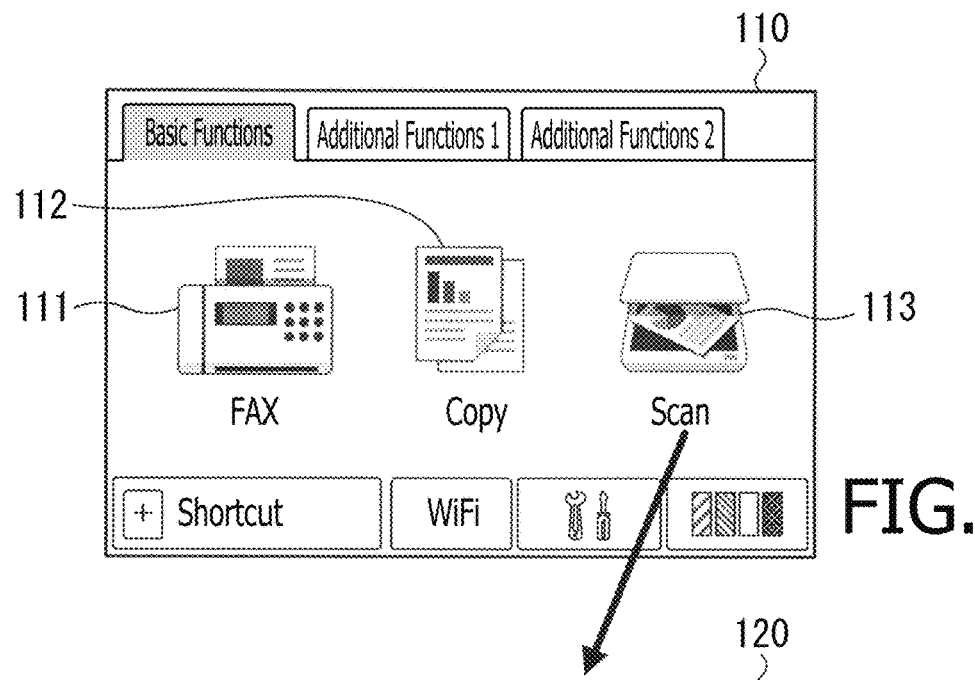

| | | | | |
|---|---|---|---|---|
| 2004/0184069 A1* | 9/2004 | Mifune | ................... | G06K 15/00 |
| | | | | 358/1.15 |
| 2005/0076309 A1* | 4/2005 | Goldsmith | ............ | G06F 3/0482 |
| | | | | 715/811 |
| 2007/0035616 A1* | 2/2007 | Lee | .................... | H04N 1/00307 |
| | | | | 348/14.16 |
| 2010/0281363 A1* | 11/2010 | Inaba | ................... | G06F 3/0488 |
| | | | | 715/702 |
| 2012/0144329 A1* | 6/2012 | Sasaki | .......................... | 715/764 |
| 2012/0254805 A1* | 10/2012 | Pic | ........................ | G06F 3/0482 |
| | | | | 715/834 |
| 2012/0304084 A1* | 11/2012 | Kim | ...................... | G06F 3/0486 |
| | | | | 715/762 |
| 2012/0317515 A1* | 12/2012 | Wang | ................... | G06F 1/1626 |
| | | | | 715/841 |
| 2014/0101577 A1* | 4/2014 | Kwak | ................... | G06F 1/1618 |
| | | | | 715/761 |
| 2014/0157204 A1* | 6/2014 | Roberts | ................... | H04L 67/10 |
| | | | | 715/841 |
| 2014/0375578 A1* | 12/2014 | Ogino | ...................... | G06F 17/24 |
| | | | | 345/173 |
| 2015/0309704 A1* | 10/2015 | Bae | ........................ | G06F 1/1677 |
| | | | | 715/765 |
| 2016/0216864 A1* | 7/2016 | Miyazaki | ........... | H04N 1/00411 |

FOREIGN PATENT DOCUMENTS

| | | | | |
|---|---|---|---|---|
| JP | 2011154474 A | * | 8/2011 | |
| JP | 2018055462 A | * | 4/2018 | |

* cited by examiner

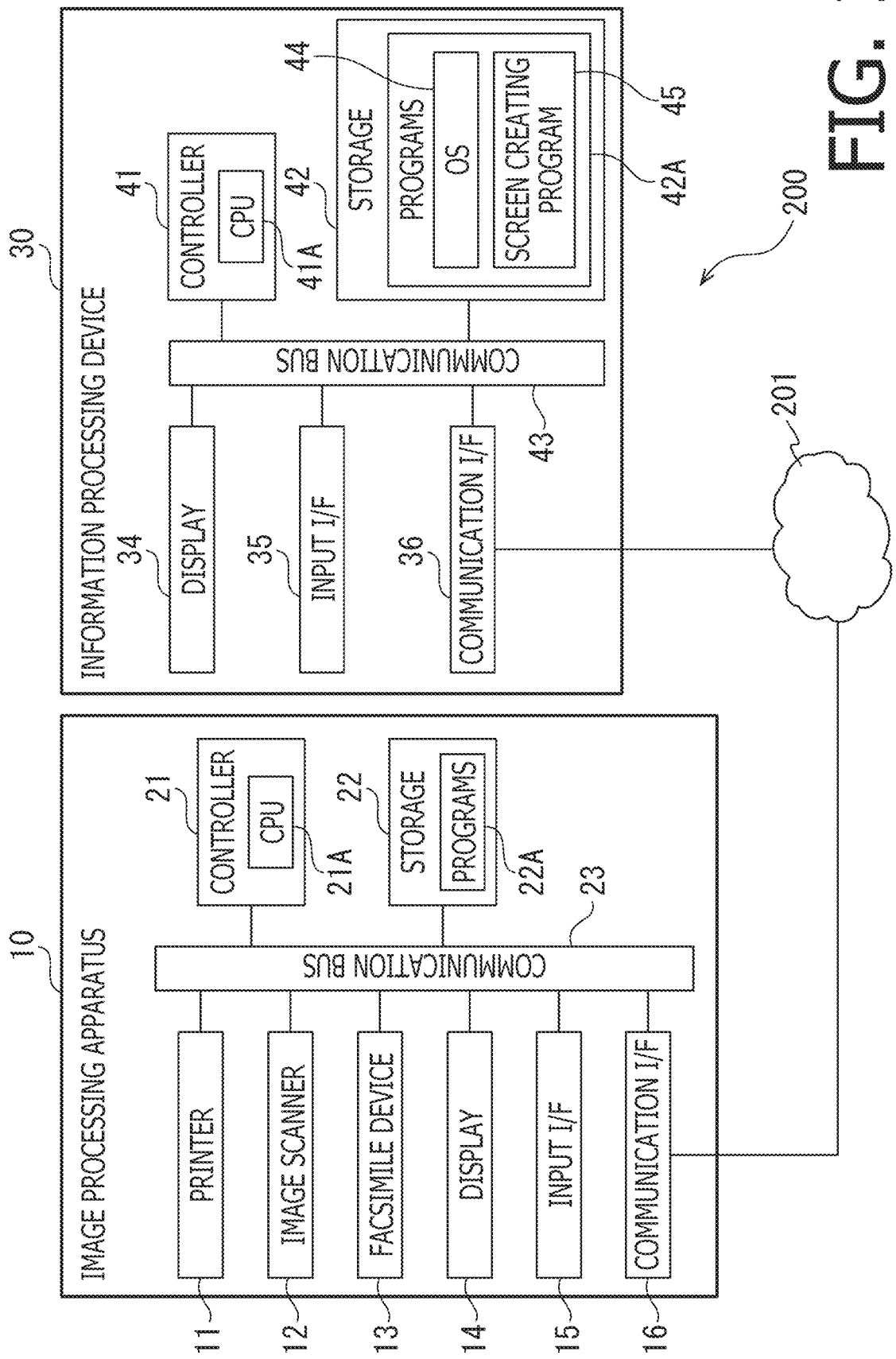

FIG. 3

<Folder Records>

| Folder ID | Attribute | Allowable Attribute List | Internal Object List | Object Arrangement Format |
|---|---|---|---|---|
| 001 | top | All | 001<br>002<br>003 | Horizontal Arrangement |
| 002 | scan | scan | 004<br>005<br>006 | Horizontal Arrangement |
| 003 | scan | scan | 007<br>008 | Vertical Arrangement |
| 004 | scan | scan | 009<br>010 | Horizontal Arrangement |
| ... | ... | ... | ... | ... |

FIG. 4

<Object Records>

| Object ID | Icon Image Data | Text Data | Operation ID | Operation Parameter(s) | Attribute |
|---|---|---|---|---|---|
| 001 | standard01_normal.jpg<br>standard01_pushed.jpg | FAX | Fax | Destination : "*****" | fax |
| 002 | standard02_normal.jpg<br>standard02_pushed.jpg | Copy | Copy | Size : "A4"<br>Monochrome/Color : "Color" | copy |
| 003 | folder01_normal.jpg<br>folder01_pushed.jpg | Scan | Folder | Open : "FolderID 002" | scan |
| 004 | folder02_normal.jpg<br>folder02_pushed.jpg | Scan to PC | Folder | Open : "FolderID 003" | scan |
| 005 | standard03_normal.jpg<br>standard03_pushed.jpg | Scan to Email | Scan to Email | Resolution : "300dpi"<br>Format : "PDF"<br>Destination : "*****" | scan |
| 006 | standard04_normal.jpg<br>standard04_pushed.jpg | Scan to Network | Folder | Open : "FolderID 004" | scan |
| 007 | standard05_normal.jpg<br>standard05_pushed.jpg | PC_FILE | Scan to PC_File | Resolution : "300dpi"<br>Format : "PDF"<br>Destination : "*****" | scan |
| 008 | standard06_normal.jpg<br>standard06_pushed.jpg | PC_OCR | Scan to PC_OCR | Resolution : "300dpi"<br>Format : "PDF"<br>Destination : "*****" | scan |
| ... | ... | ... | ... | ... | ... |

COMPUTER-READABLE MEDIUM, INFORMATION PROCESSING DEVICE, AND METHOD FOR CUSTOMIZING A SCREEN TO BE DISPLAYED ON A DISPLAY APPARATUS

CROSS-REFERENCE TO RELATED APPLICATION

This application claims priority under 35 U.S.C. § 119 from Japanese Patent Application No. 2018-067436 filed on Mar. 30, 2018. The entire subject matter of the application is incorporated herein by reference.

BACKGROUND

Technical Field

Aspects of the present disclosure are related to a non-transitory computer-readable medium, an information processing device, and a method for customizing a screen to be displayed on a display apparatus separate from the information processing device.

Related Art

A technology to customize, on an information processing device, a screen to be displayed on a display of an image processing apparatus (e.g., a printer) has been known. More specifically, in the known technology, one or more previously-prepared UI parts may be added onto the screen by a drag-and-drop operation of the one or more UI parts.

SUMMARY

It would be convenient if a user could perform not only adding one or more UI parts onto a screen but also various types of customizations such as moving one or more UI parts between screens in different layers of a screen hierarchy.

Aspects of the present disclosure are advantageous to provide one or more improved techniques for easily moving an object between screens in different layers of a screen hierarchy to customize, on an information processing device, the screens to be displayed on a display apparatus.

According to aspects of the present disclosure, a non-transitory computer-readable medium is provided, which stores computer-readable instructions that are executable by a processor coupled with an information processing device. The information processing device includes a display, an input interface, and a communication interface configured to communicate with a display apparatus. The display apparatus has a plurality of pieces of screen data respectively representing a plurality of screens, and is configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object. The instructions are configured to, when executed by the processor, cause the processor to obtain the plurality of pieces of screen data, control the display to display a first customizing screen corresponding to the first screen, based on the first screen data included in the obtained plurality of pieces of screen data, the first customizing screen including one or more objects that include the particular type of object, in response to the particular type of object on the first customizing screen being selected via the input interface, control the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon, accept, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen, place the target object on the move-destination screen in accordance with the accepted move operation, in response to accepting the move operation via the input interface, update the first screen data and the second screen data, based on the move-source screen and the move-destination screen between which the target object has been moved, and transmit the updated first screen data and the updated second screen data to the display apparatus via the communication interface.

According to aspects of the present disclosure, further provided is an information processing device including a controller, a display, an input interface, and a communication interface configured to communicate with a display apparatus. The display apparatus has a plurality of pieces of screen data respectively representing a plurality of screens, and is configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object. The controller of the information processing device is configured to obtain the plurality of pieces of screen data, control the display to display a first customizing screen corresponding to the first screen, based on the first screen data included in the obtained plurality of pieces of screen data, the first customizing screen including one or more objects that include the particular type of object, in response to the particular type of object on the first customizing screen being selected via the input interface, control the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon, accept, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen, place the target object on the move-destination screen in accordance with the accepted move operation, in response to accepting the move operation via the input interface, update the first screen data and the second screen data, based on the move-source screen and the move-destination screen between which the target object has been moved, and transmit the updated first screen data and the updated second screen data to the display apparatus via the communication interface.

According to aspects of the present disclosure, further provided is a method implementable on a processor coupled with an information processing device. The information processing device includes a display, an input interface, and a communication interface configured to communicate with a display apparatus. The display apparatus has a plurality of pieces of screen data respectively representing a plurality of screens, and is configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object. The method includes obtaining the plurality of pieces of screen data, controlling the display to display a first customizing screen corresponding to the first screen, based on the first screen data included in the obtained plurality of pieces of screen data, the first customizing screen including one or more objects that include the particular type of object, in response to the particular type of object on the first customizing screen being selected via the input interface, controlling the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon, accepting, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen, placing the target object on the move-destination screen in accordance with the accepted move operation, in response to accepting the move operation via the input interface, updating the first screen data and the second screen data, based on the move-source screen and the move-destination screen between which the target object has been moved, and transmitting the updated first screen data and the updated second screen data to the display apparatus via the communication interface.

BRIEF DESCRIPTION OF THE ACCOMPANYING DRAWINGS

FIG. 1 is a block diagram schematically showing a configuration of an information processing system in an illustrative embodiment according to one or more aspects of the present disclosure.

Figure 2B:
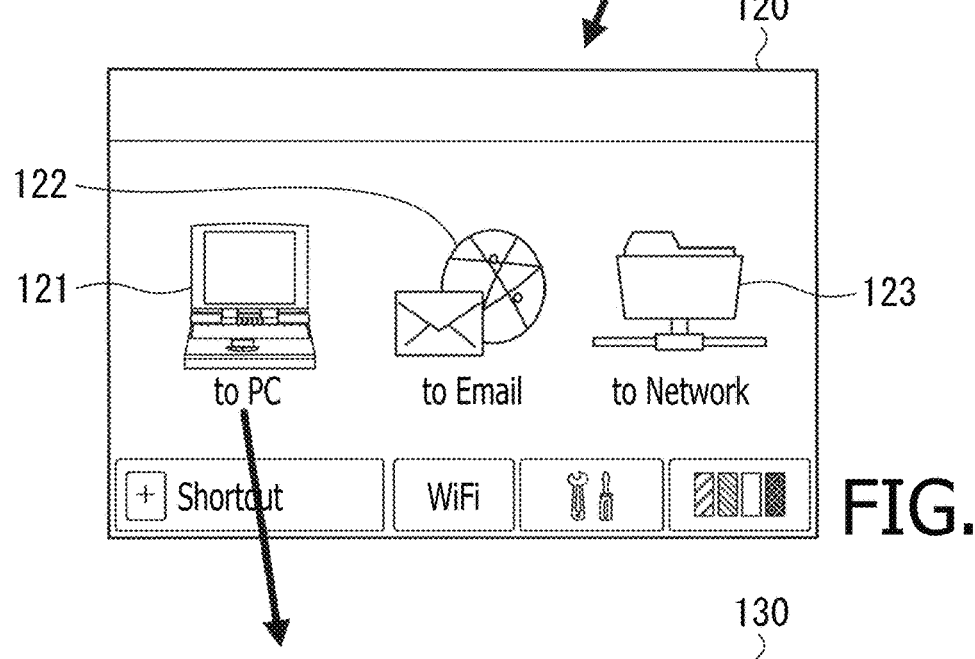
Figure 2C:
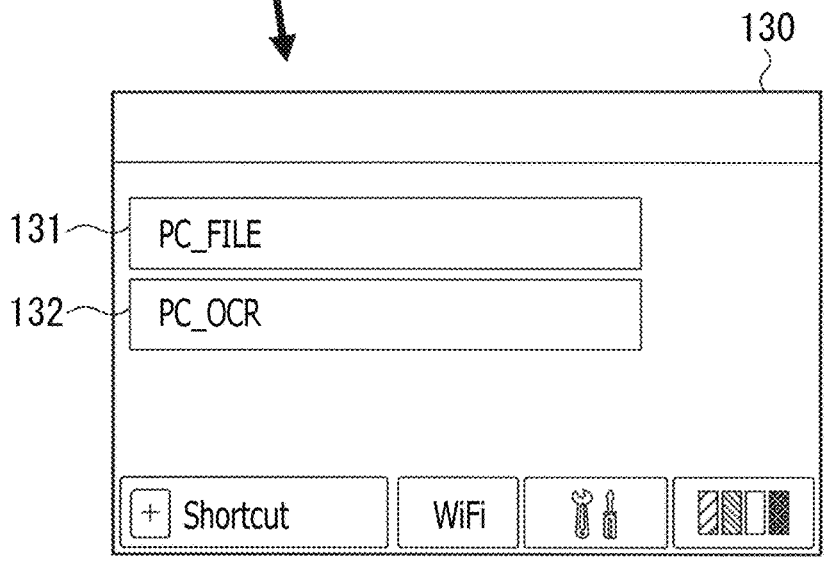

FIGS. 2A to 2C exemplify a first screen, a second screen, and a third screen to be displayed on a display of an image processing apparatus included in the information processing system, respectively, in the illustrative embodiment according to one or more aspects of the present disclosure.

FIG. 3 exemplifies folder records each representing information on a corresponding screen to be displayed on the display of the image processing apparatus, in the illustrative embodiment according to one or more aspects of the present disclosure.

FIG. 4 exemplifies object records each representing information on a corresponding object to be displayed on the display of the image processing apparatus, in the illustrative embodiment according to one or more aspects of the present disclosure.

Figure 5A:
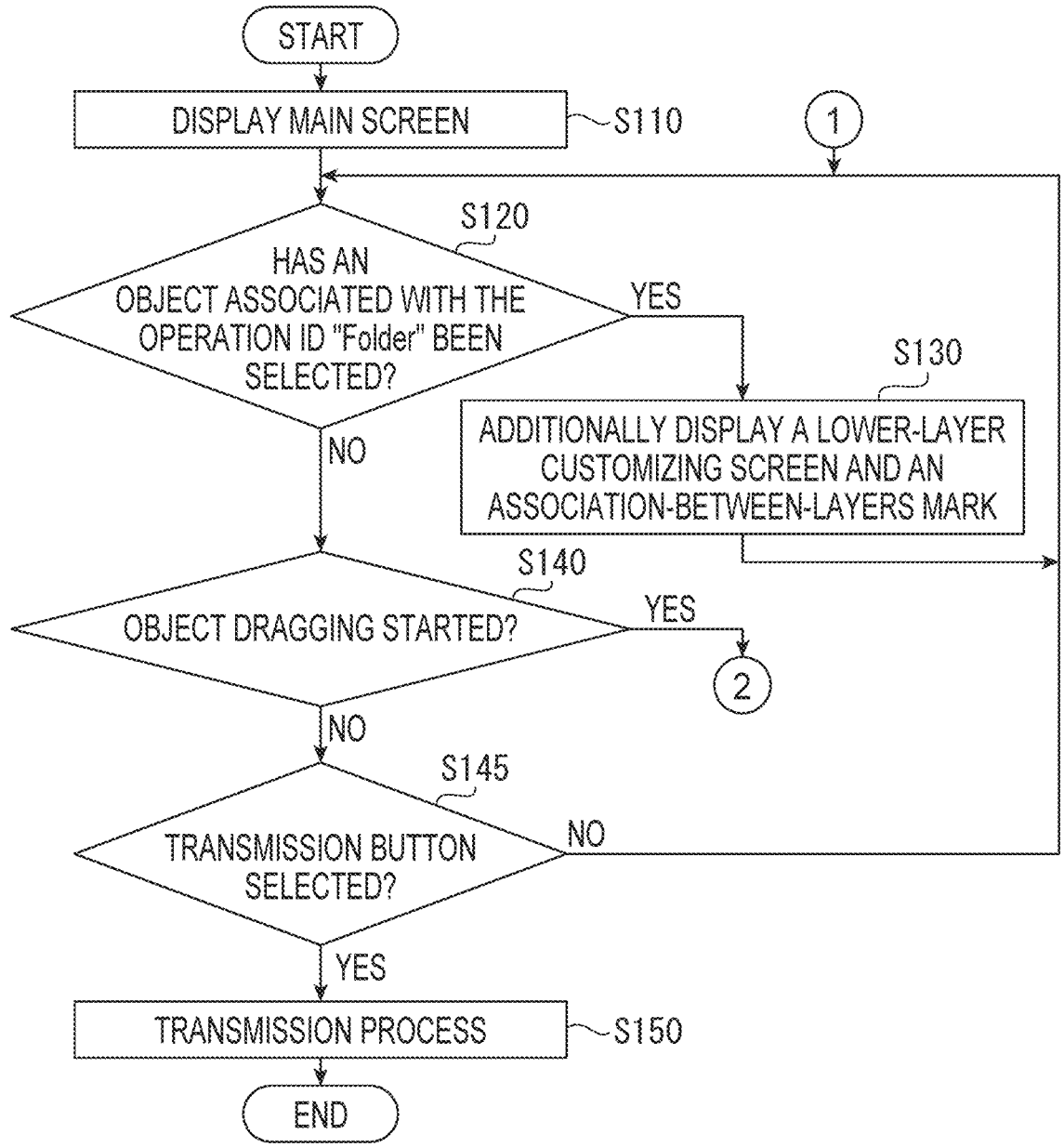
Figure 5B:
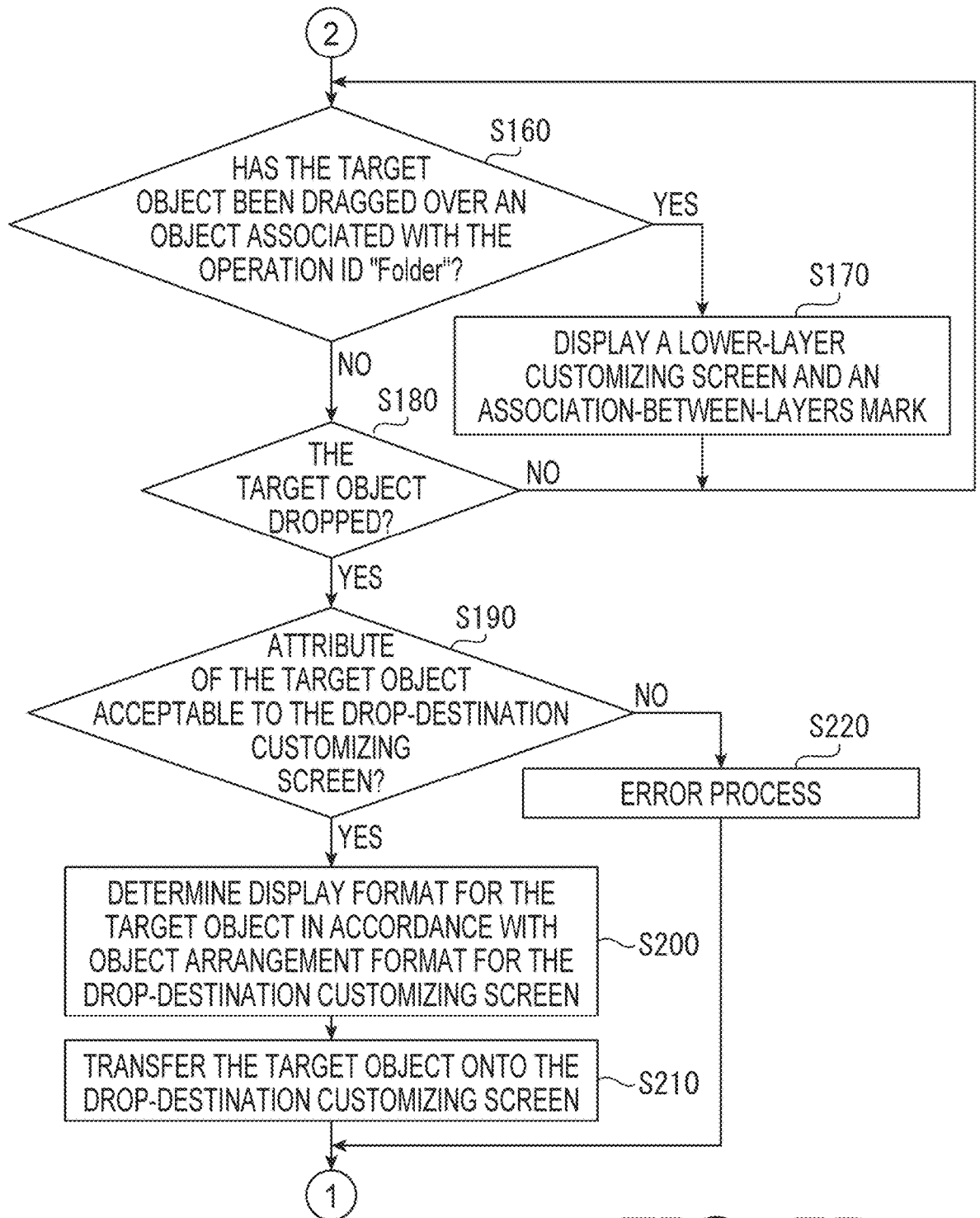

FIGS. 5A and 5B are flowcharts showing a procedure of a screen creating process to be executed by a controller of an information processing device included in the information processing system, in the illustrative embodiment according to one or more aspects of the present disclosure.

Figure 6:
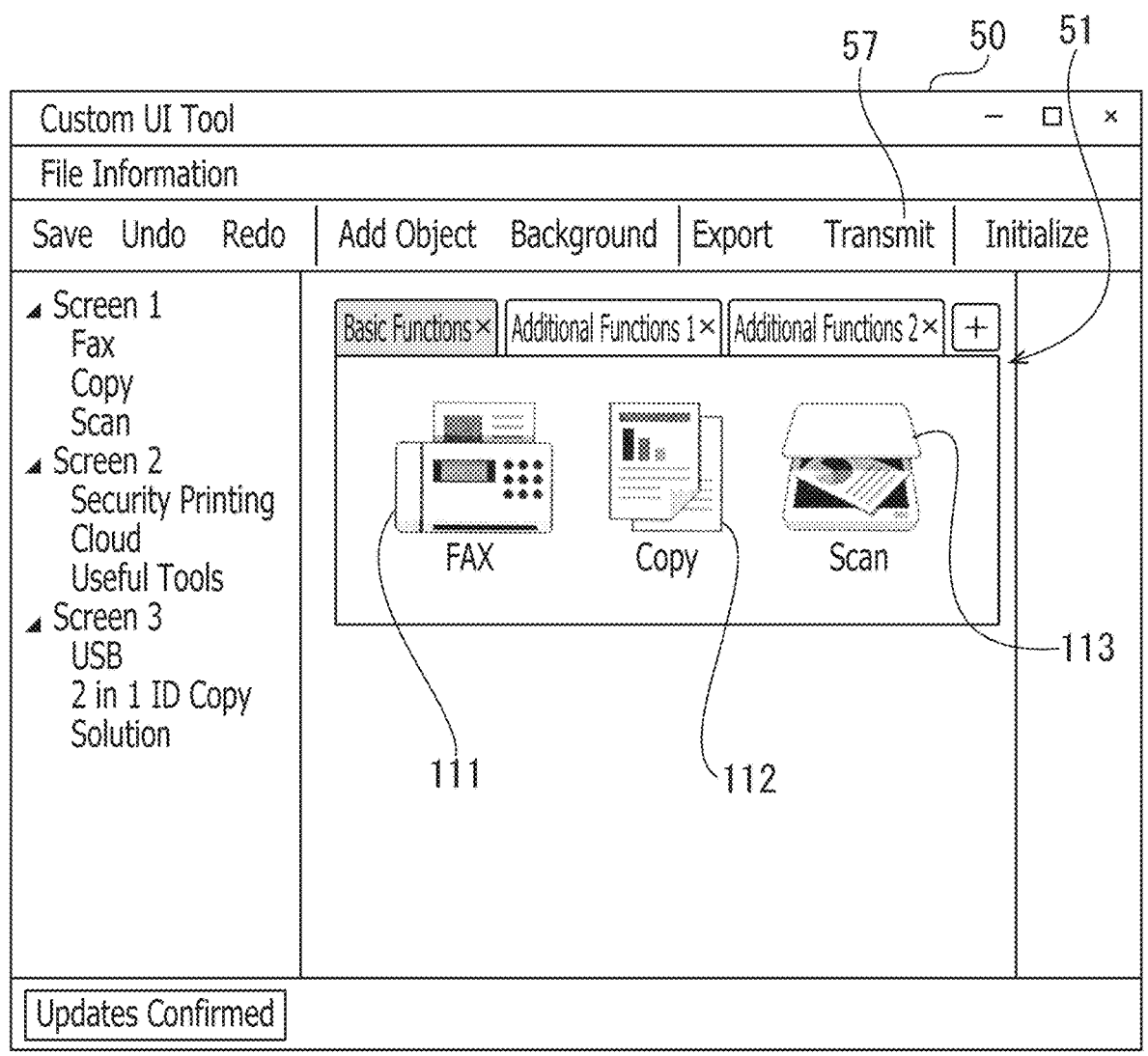

FIG. 6 exemplifies a main screen on which a first customizing screen is displayed, in the illustrative embodiment according to one or more aspects of the present disclosure.

Figure 7:
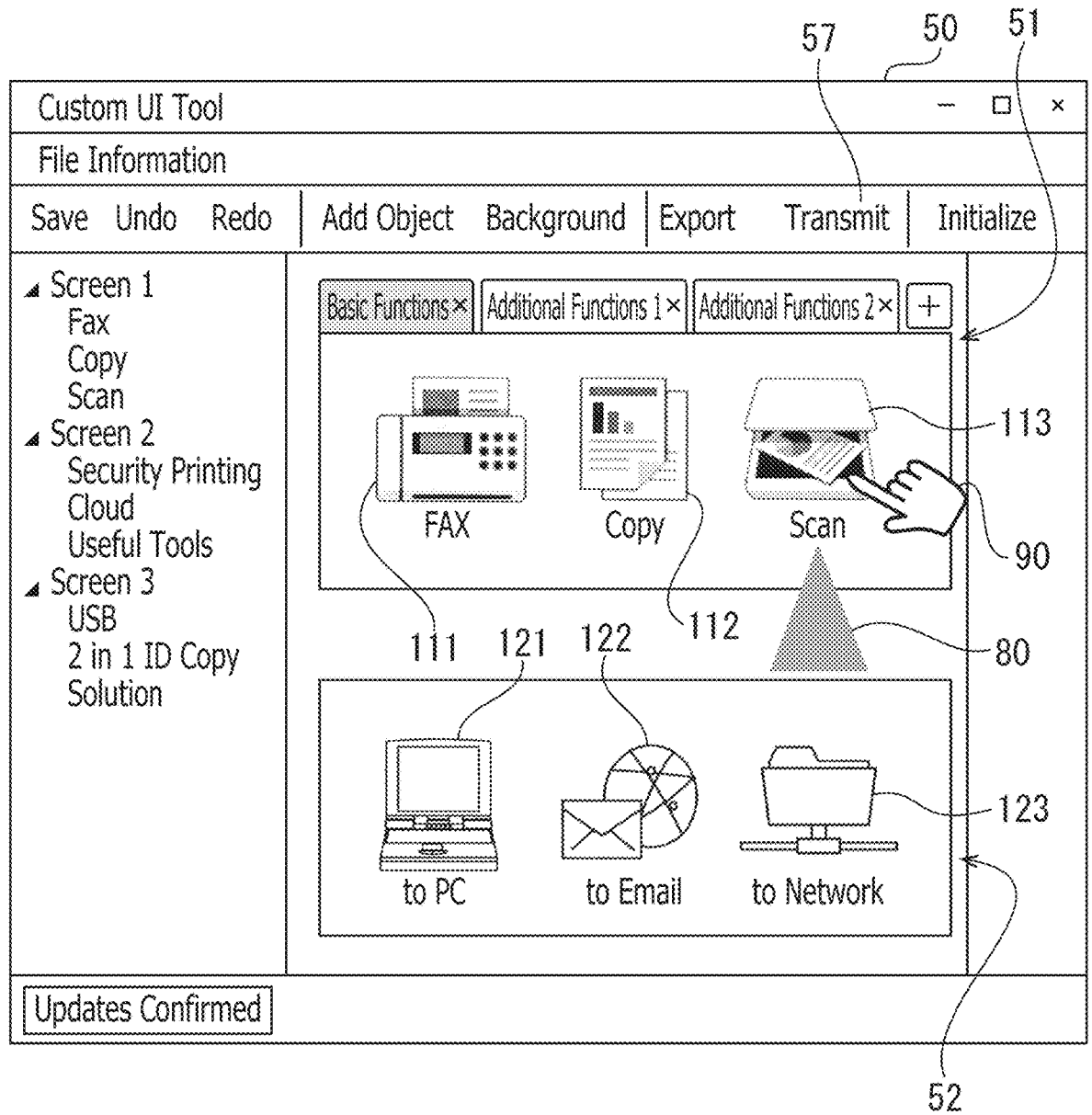

FIG. 7 exemplifies the main screen on which the first customizing screen and a second customizing screen are displayed, in the illustrative embodiment according to one or more aspects of the present disclosure.

Figure 8:
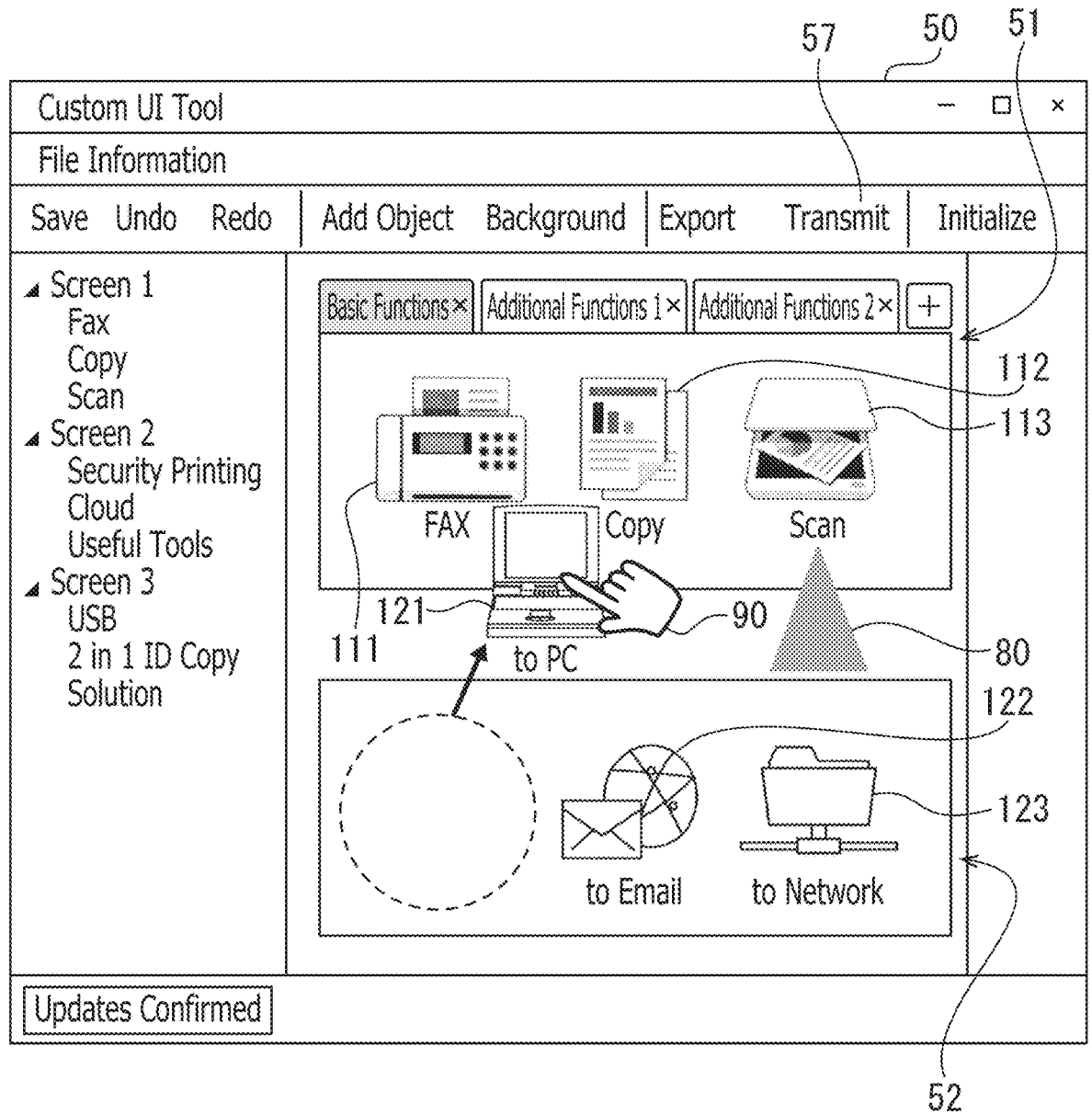

FIG. 8 exemplifies the main screen on which an object is moved from the second customizing screen onto the first customizing screen, in the illustrative embodiment according to one or more aspects of the present disclosure.

Figure 9:
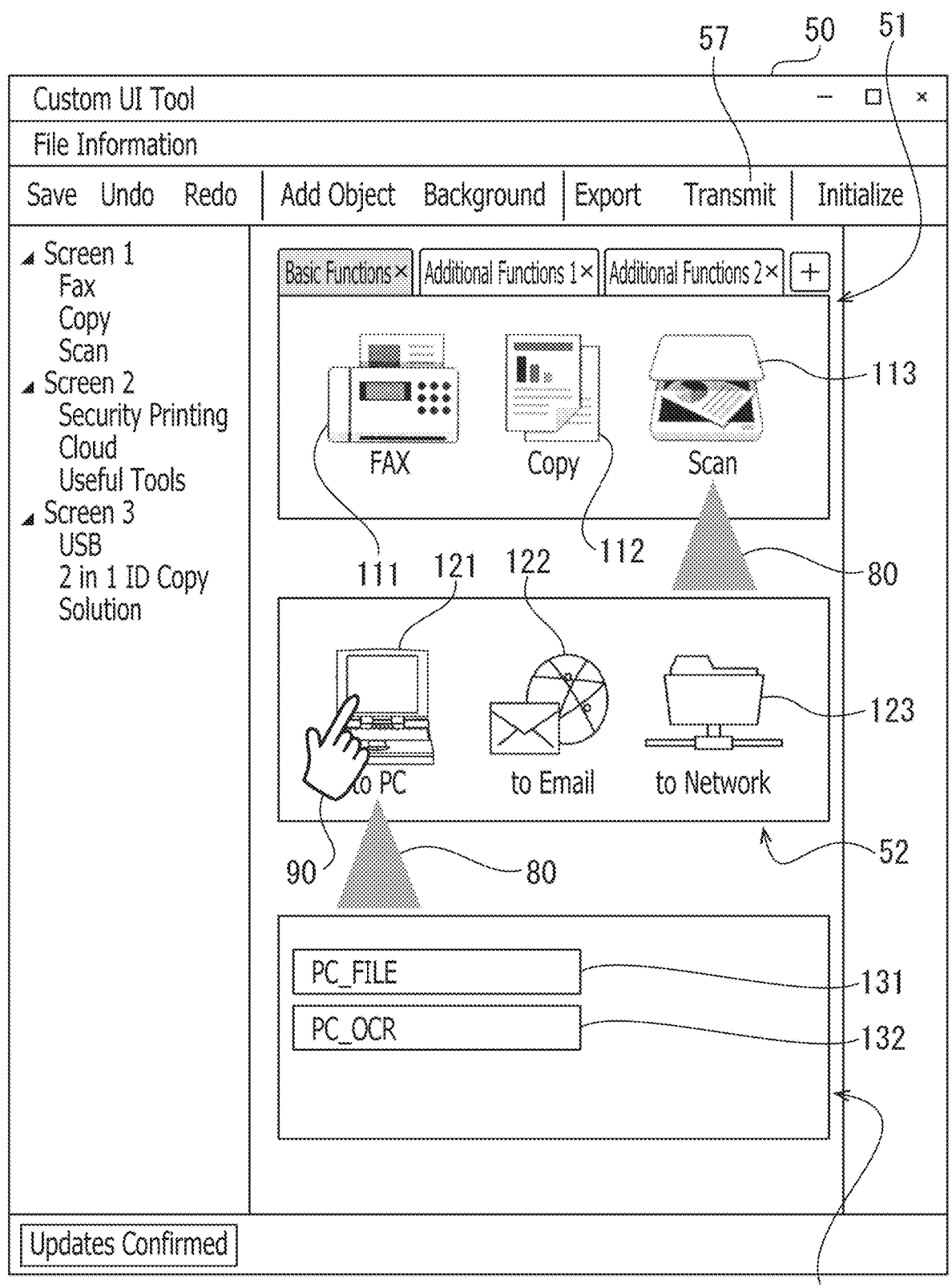

FIG. 9 exemplifies the main screen on which the first customizing screen, the second customizing screen, and the third customizing screen are displayed, in the illustrative embodiment according to one or more aspects of the present disclosure.

Figure 10:
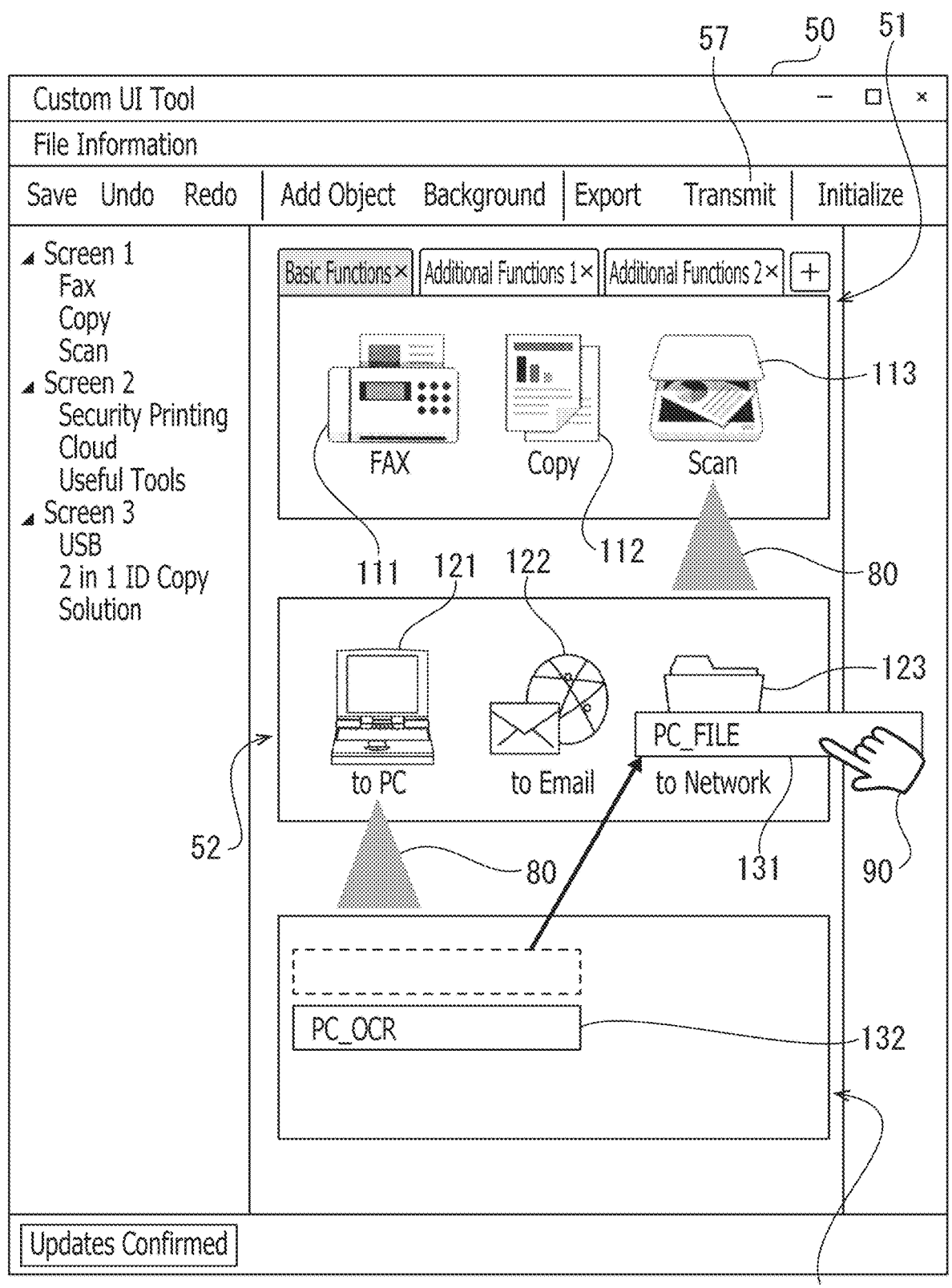

FIG. 10 exemplifies the main screen on which an object on the third customizing screen is dragged over an object on the second customizing screen in a layer one-level higher than the third customizing screen in a screen hierarchy, in the illustrative embodiment according to one or more aspects of the present disclosure.

Figure 11:
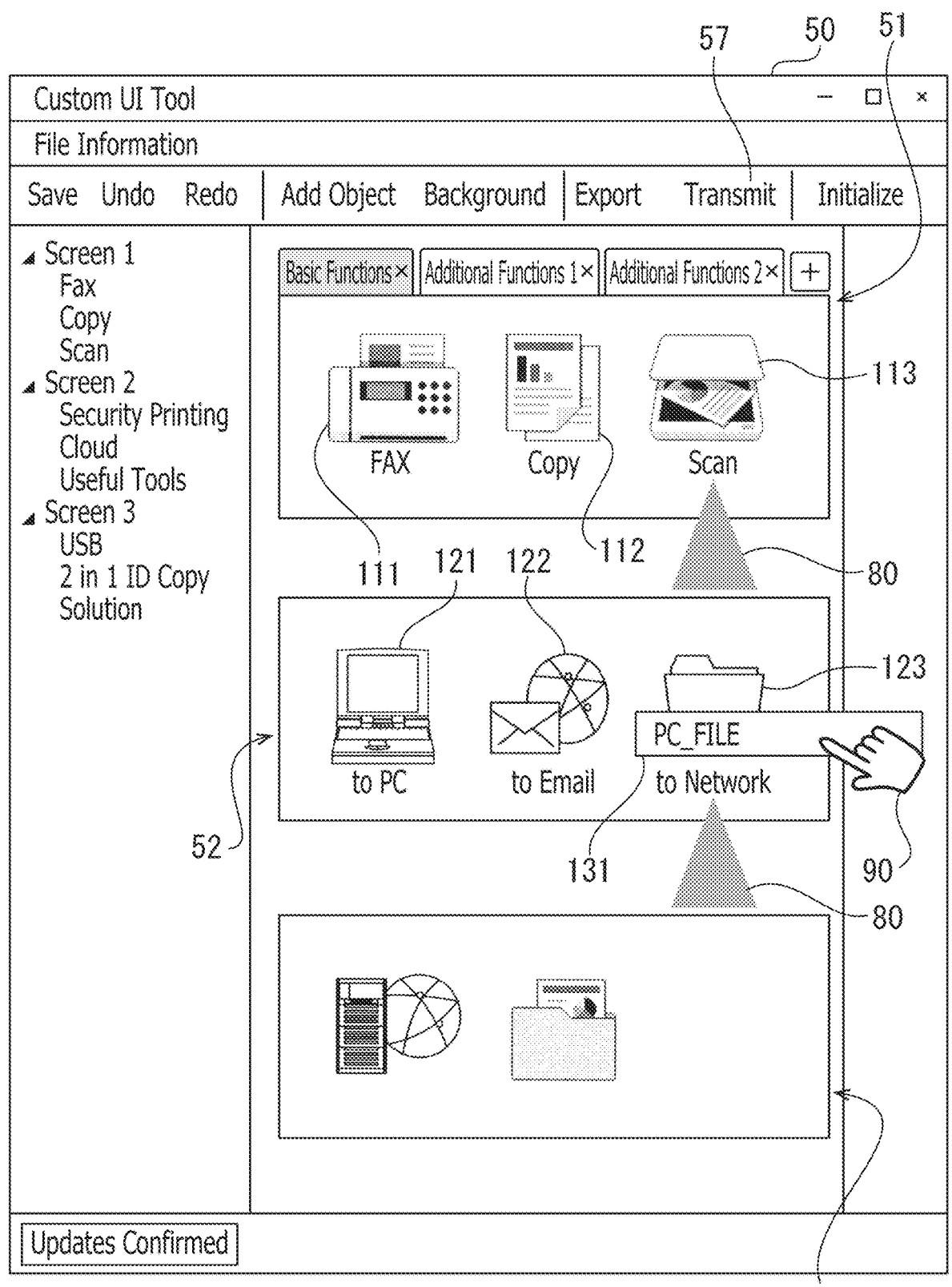

FIG. 11 exemplifies the main screen on which a fourth customizing screen, which is in a layer one-level lower than the second customizing screen in the screen hierarchy, is newly displayed instead of the third customizing screen, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Illustrative Embodiment (1) General Overview of Information Processing System

As shown in FIG. 1, an information processing system 200 of the illustrative embodiment includes an image processing apparatus 10 and an information processing device 30. The image processing apparatus 10 and the information processing device 30 are communicably connected with each other via a communication network 201. For instance, the communication network 201 may be, but not limited to, the Internet, a wired LAN, a wireless LAN, or a combination of at least two of them. Further, for instance, the image processing apparatus 10 and the information processing device 30 may be mutually communicable via communication media (e.g., a USB cable) according to various communication standards.

(2) Configuration of Image Processing Apparatus

As shown in FIG. 1, the image processing apparatus 10 includes a printer 11, an image scanner 12, a facsimile device 13, a display 14, an input I/F ("I/F" is an abbreviation of "interface") 15, a communication I/F 16, a controller 21, and a storage 22. The aforementioned elements included in the image processing apparatus 10 are interconnected via a communication bus 23. The image processing apparatus 10 may have a plurality of basic functions such as a printing function, a scanning function, a facsimile function, and a copy function.

The printer 11 provides the printing function. The printer 11 is configured to form an image based on image data on a sheet-shaped printing medium in an inkjet method or an electrophotographic method, using a printing mechanism thereof.

The image scanner 12 provides the scanning function. The image scanner 12 is configured to scan an image of a document sheet by an image sensor and generate image data of the scanned image.

The facsimile device 13 provides the facsimile function. The facsimile device 13 is configured to transmit facsimile data to one or more external devices and receive facsimile data from the one or more external devices.

The communication I/F 16 is configured to communicate with the one or more external devices via the communication network 201. The display 14 includes a display device configured to display an image thereon. For instance, the display device may be, but not limited to, an LCD device or an organic EL display device.

The input I/F 15 includes one or more input devices, such as one or more hard keys and a touch panel, configured to accept various types of input operations. The touch panel may be overlaid on a display area of the display 14.

The touch panel is an input device configured to detect an indicating operation to indicate a particular position in the display area of the display 14 with an indicator such as a finger, a touch pen, and a stylus. Examples of the "indicating operation" may include, but are not limited to, bringing the indicator in contact with or proximity to the particular position. The touch panel is further configured to, when the indicating operation is performed, output a detection signal representing the particular position indicated by the indicator.

Based on the detection signal output from the touch panel, the controller 21 detects (determines) whether the indicating operation has been performed, and detects where has been indicated by the indicator in response to detecting (determining) that the indicating operation has been performed. Further, based on those detection results, the controller 21 detects what type of user operation is the performed indicating operation. For instance, detectable types of user operations may include, but are not limited to, tapping, dragging, dragging and dropping, flicking, pinching in, and pinching out.

For instance, the controller 21 may include a CPU 21A. The controller 21 is configure to control operations of each element included in the image processing apparatus 10, thereby implementing the aforementioned functions such as the printing function, the scanning function, the facsimile function, and the copy function.

For instance, the storage 22 may include semiconductor memories such as a ROM, a RAM, an NVRAM, and a flash memory. Namely, the image processing apparatus 10 is provided with a microcomputer including the CPU 21A and the semiconductor memories. The storage 22 stores various programs 22A and various kinds of data. Although the storage 22 is shown as an element separate from the controller 21 in FIG. 1, the storage 22 may be included in the controller 21. Namely, the controller 21 may include the CPU 21A and the storage 22 storing the programs 22A executable by the CPU 21A.

The controller 21 may implement the aforementioned functions by executing the various programs 22A stored in the storage 22. Each function implementable by the controller 21 may not necessarily be implemented by executing one or more programs 22A, but may entirely or partially be implemented by using one or more hardware elements.

The controller 21 may cause the display to display various screens such as a first screen 110. The controller 21 performs a particular initializing process after being activated, and thereafter causes the display 14 to display the first screen 110. FIG. 2A exemplifies the first screen 110 to be displayed on the display 14.

As shown in FIG. 2A, the first screen 110 includes a plurality of objects 111 to 113 displayed thereon. In the illustrative embodiment, the first screen 110 is a tabbed-form screen including a plurality of tabs each of which is associated with an individual screen. Namely, on the first screen 110, a corresponding screen associated with a selected one of the plurality of tabs is displayed. In the example shown in FIG. 2A, when a tab with a name "Basic Functions" is selected, the first screen 110 associated with the selected tab is displayed.

In response to one of the objects displayed on the first screen 110 being selected, a process associated with the selected object is performed. The objects may be roughly classified into two types of objects, i.e., folder-type objects and non-folder-type objects.

Each non-folder-type object is associated with a specific function. Namely, each non-folder-type object is configured to, when selected, cause the controller 21 to perform a specific function associated with the selected object. Examples of the specific functions may include, but are not limited to, a printing function, a scanning function, a facsimile function, a copy function, and a combination of at least two of the aforementioned functions.

Selection of an object may be made by any kind of operation. For instance, a target object may be selected by tapping the target object. Each folder-type object is configured to, when selected, cause the display 14 to display a specific screen that is associated with the selected object and is in a layer one-level lower than a higher-layer screen on which the selected object is currently displayed in a screen hierarchy. It is noted that the first screen 110 shown in FIG. 2A is a primary screen in a first layer of the screen hierarchy.

Regarding the objects on the first screen 110 shown in FIG. 2A, for instance, a first object 111 and a second object 112 may be classified as the non-folder-type objects. Further, a third object 113 may be classified as the folder-type object. Therefore, when the third object 113 is selected on the first screen 110, as shown in FIG. 2B, the screen displayed on the display 14 makes a transition from the first screen 110 to a second screen 120 that is associated with the selected third object 113 and is in a second layer of the screen hierarchy.

As shown in FIG. 2B, the second screen 120 includes a plurality of objects 121 to 123 displayed thereon. Regarding the objects on the second screen 120, for instance, a first object 121 and a third object 123 may be classified as the folder-type objects. Further, a second object 122 may be classified as the non-folder-type object.

Therefore, for instance, when the first object 121 is selected on the second screen 120, as shown in FIG. 2C, the screen displayed on the display 14 makes a transition from the second screen 120 to a third screen 120 in a third layer that is associated with the selected first object 121.

As shown in FIG. 2C, the third screen 130 includes a plurality of objects 131 and 132 displayed thereon. Regarding the objects on the third screen 130, for instance, each of the objects 131 and 132 may be classified as the non-folder-type object.

The storage 22 stores folder records each representing information on a corresponding screen to be displayed on the display 14. The controller 21 causes the display 14 to display the corresponding screens based on the folder records stored in the storage 22.

FIG. 3 exemplifies the folder records. As shown in FIG. 3, each folder record has a folder ID, attribute information, an allowable attribute list, an internal object list, and object arrangement format information.

A folder record (hereinafter referred to as a "folder record 001") having a folder ID "001" is associated with the first screen 110. A folder record having a folder ID "002" is associated with the second screen 120. A folder record having a folder ID "003" is associated with the third screen 130. A folder record having a folder ID "004" is associated with a fourth screen (not shown). After being activated, the controller 21 refers to the folder record 001 and causes the display 14 to display the first screen 110 based on the folder record 001.

The attribute information of each folder record represents an attribute of the corresponding screen. For instance, an attribute "Scan" represents a screen including an object associated with a process related to the scanning function. The allowable attribute list of each folder record represents respective attributes of one or more objects settable on the corresponding screen.

As will be described later, each object to be displayed on each screen has an attribute set therefor. Further, as will be described later, each object to be displayed on each screen may be moved onto another screen. In this regard, however, in an attempt to move a target object onto an intended screen, when the attribute of the target object is included in the allowable attribute list of the intended screen as a move destination, the target object is allowed to be moved onto the intended screen. It is noted that an allowable attribute list "All" represents that all attributes are included in the allowable attribute list, i.e., that an object having any attribute is allowed to be moved onto a screen associated with the allowable attribute list "All."

The internal object list of each folder record represents one or more objects to be displayed on the corresponding screen. Specifically, the internal object list includes respective object IDs of the one or more objects to be displayed on the corresponding screen. For instance, the folder record having the folder ID "001" represents that three objects identified by object IDs "001" to "003" are to be displayed on the first screen 110.

The object arrangement format information of each folder record represents an arrangement format for arranging one or more objects to be displayed on the corresponding screen. In the illustrative embodiment, for instance, there are two arrangement formats such as "horizontal arrangement" and "vertical arrangement," a corresponding one of which is set for each folder record.

The horizontal arrangement is an arrangement format in which objects are arranged in a horizontal direction, as the objects 111 to 113 are arranged on the first screen 110 shown in FIG. 2A. Each object to be displayed in accordance with the horizontal arrangement includes an icon image.

The vertical arrangement is an arrangement format in which objects are arranged in a vertical direction, as the objects 131 and 132 are arranged on the third screen 130 shown in FIG. 2C. Each object to be displayed in accordance with the vertical arrangement does not include any icon image but includes a text.

It is noted that although the first screen 110 has a plurality of folder records each representing an individual screen associated with each tab, FIG. 3 shows only a folder record for the screen associated with the tab name "Basic Functions" without showing any folder records for the screens associated with the other tabs.

The storage 22 stores object records each representing information on a corresponding object to be displayed on the display 14. The controller 21 causes the display 14 to display the corresponding objects based on the object records stored in the storage 22.

FIG. 4 exemplifies the object records. As shown in FIG. 4, each object record has an object ID, icon image data, text data, an operation ID, operation parameter(s), and attribute information.

The icon image data represents an icon image to be displayed on a screen associated with the "horizontal arrangement" as the object arrangement format information therefor. The text data represents a text to be displayed on a screen associated with the "vertical arrangement" as the object arrangement format information therefor. In the illustrative embodiment, as exemplified in FIGS. 2A and 2B, even on the screen associated with the "horizontal arrangement," a text represented by text data is displayed as well as the corresponding icon image.

The operation ID is information for identifying an operation to be performed when a corresponding object is selected. The operation parameter(s) represent a setting value each for each setting item used for performing the operation identified by the operation ID. For instance, when the operation ID is "Copy," corresponding operation parameters may include a copy size, color settings, and a scale factor (i.e., a magnification/reduction rate).

In response to one of the objects displayed on the display 14 being selected, the controller 21 performs an operation identified by the operation ID associated with the selected object, in accordance with the operation parameter(s) associated with the selected object.

Further, the operation ID included in each object record also represents whether the corresponding object is a folder-type object or a non-folder-type object. Specifically, each object record having the operation ID "Folder" represents that the corresponding object is a folder-type object. Further, each object record having an operation ID different from "Folder" represents that the corresponding object is a non-folder-type object.

Each object record having the operation ID "Folder" is set with a folder ID representing a screen as a move destination, as the operation parameter(s). In response to an object associated with the operation ID "Folder" being selected, the controller 21 switches the screen being displayed on the display 14 to a screen associated with a folder ID corresponding to the operation parameter(s) set for the selected object.

The first screen 110 shown in FIG. 2A is a screen to be displayed based on the folder record identified by the folder ID "001." The objects 111 to 113 on the first screen 110 are displayed based on the object records identified by the object IDs "001" to "003," respectively. Then, when the third object 113 is selected, since the selected third object 113 is associated with the operation ID "Folder" and the folder ID "002" as the operation parameter(s), the screen being displayed on the display 14 is switched to the second screen 120 (see FIG. 2B) based on the folder record identified by the folder ID "002."

The objects 121 to 123 on the second screen 120 are displayed based on the object records identified by the object IDs "004" to "006," respectively. Then, when the first object 121 is selected, since the selected first object 121 is associated with the operation ID "Folder" and the folder ID "003" as the operation parameter(s), the screen being displayed on the display 14 is switched to the third screen 130 (see FIG. 2C) based on the folder record identified by the folder ID "003."

Meanwhile, when the third object 123 is selected on the second screen 120, since the selected third object 123 is associated with the operation ID "Folder" and the folder ID "004" as the operation parameter(s), the screen being displayed on the display 14 is switched to the fourth screen (not shown) based on the folder record identified by the folder ID "004."

(3) Configuration of Information Processing Device

The information processing device 30 may be an information processing terminal such as a personal computer, a tablet terminal, and a smartphone. As shown in FIG. 1, the information processing device 30 includes a display 34, an input I/F 35, a communication I/F 36, a controller 41, and a storage 42, which are interconnected via a communication bus 43.

The controller 41 may include a CPU 41A. The storage 42 may include semiconductor memories such as a ROM, a RAM, an NVRAM, and a flash memory. Namely, the information processing device 30 of the illustrative embodiment is provided with a microcomputer including the CPU 41A and the semiconductor memories. Although the storage 42 is shown as an element separate from the controller 41 in FIG. 1, the storage 42 may be included in the controller 41. Namely, the controller 41 may include the CPU 41A and the storage 42 storing programs 42A executable by the CPU 41A.

The controller 41 (more specifically, the CPU 41A) may be configured to execute the programs 42A stored in the storage 42 as a non-transitory computer-readable storage medium, thereby implementing various functions of the information processing device 30. Nonetheless, each function implementable by the controller 41 may not necessarily be implemented by executing one or more programs 42A, but may be entirely or partially be implemented by using one or more hardware elements.

The storage 42 stores various kinds of software and data. In the illustrative embodiment, at least an OS ("OS" is an abbreviation of "operating system") and a screen creating program 45 are stored as software in the storage 42. The screen creating program 45 is for customizing the first screen 110 to be displayed on the image processing apparatus 10.

In the following description, the controller 41 (more specifically, the CPU 41A) executing a specific one of the programs 42A may be simply referred to as a name of the specific program 42A. For instance, what is simply expressed as "the screen creating program 45" may denote "the CPU 41 executing the screen creating program 45."

The display 34 includes a display device configured to display an image thereon. For instance, the display device may be, but not limited to, an LCD device or an organic EL display device.

The input I/F 35 includes one or more input devices, such as a keyboard, a mouse, and a touch panel, configured to accept various types of input operations. The touch panel may be overlaid on a display area of the display 34. A configuration of the touch panel of the information processing device 30 may be substantially the same as the configuration of the touch panel of the image processing apparatus 10. Further, processes to be performed by the controller 41 of the information processing device 30 based on detection signals output from the touch panel in response to detection of user operations may be substantially the same as the processes to be performed by the controller 21 of the image processing apparatus 10 based on detection signals output from the touch panel in response to detection of user operations. Further, the display 34 is configured to display a heretofore-known mouse pointer 90 (see FIG. 7) movable in response to a user operation via the mouse.

The communication I/F 36 is configured to communicate with one or more external devices. The information processing device 30 may communicate with one or more image processing apparatuses including the image processing apparatus 10 shown in FIG. 1, via the communication I/F 36.

(4) Explanation of Screen Creating Process

In the information processing device 30, when the screen creating program 45 is executed by the controller 41, a main screen 50 as shown in FIG. 6 is displayed on the display 34. The main screen 50 is used as a starting point in customizing a screen to be displayed on the display 14 of the image processing apparatus 10.

In the illustrative embodiment, the user may apply various types of customizations to each screen to be displayed on the display 14 of the image processing apparatus 10, with the main screen 50 on the display 34 of the information processing device 30 as a starting point. The various types of customizations applicable to each screen to be displayed on the display 14 of the image processing apparatus 10 may include moving an object between different screens.

A screen creating process to be performed in accordance with the screen creating program 45 will be described with reference to FIGS. 5A and 5B. The screen creating process is performed by the controller 41 (more specifically, CPU 41A) executing the screen creating program 45 stored in the storage 42.

After being activated, the controller 41 of the information processing device 30 loads and executes the screen creating program 45 in response to accepting via the input I/F 35 a particular operation to request execution of the screen creating process. After starting the screen creating process, the controller 41 controls the display 34 to display the main screen 50 shown in FIG. 6 (S110).

The main screen 50 includes at least one customizing screen and a transmission button 57 displayed thereon. In S110, a first customizing screen 51 is displayed on the main screen 50. The first customizing screen 51 corresponds to the first screen 110 to be displayed on the display 14 of the image processing apparatus 10.

Namely, the first customizing screen 51 has a plurality of tabs in the same manner as the first screen 110. On the first customizing screen 51 as well, for instance, the user may operate one of the plurality of tabs and bring the operated tab into a selected state, thereby causing the display 34 to display a screen associated with the selected tab.

In S110, the information processing device 30 obtains screen data including a folder record and one or more object records, and causes the display 34 to display the main screen 50 in accordance with the obtained screen data. The information processing device 30 may obtain the screen data from anywhere. For instance, the information processing device 30 may obtain the screen data from the image processing apparatus 10. Further, for instance, each time the screen data is updated in a below-mentioned step S150, the information processing device 30 may store the updated screen data into the storage 42. In this case, each time performing the screen creating process next time, the information processing device 30 may obtain the latest screen data stored in the storage 42 and cause the display 34 to display the main screen 50 based on the obtained latest screen data. Further, for instance, the information processing device 30 may obtain the screen data from another information processing device (not shown) that stores screen data for the image processing apparatus 10.

When the information processing device 30 obtains the screen data from the image processing apparatus 10 or obtains the latest screen data stored in the storage 42, objects 111 to 113 to be displayed on the first customizing screen 51 are the same as the objects 111 to 113 to be displayed on the first screen 110 of the image processing apparatus 10.

In S120, the controller 41 determines whether an object (i.e., a folder-type object) associated with the operation ID "Folder" has been selected from among the objects displayed on the customizing screen on the main screen 50. The method for selecting an intended object on the main screen 50 may be tapping the intended object via the touch panel or clicking the mouse in a state where the mouse pointer 90 is positioned on the intended object.

In response to determining that a folder-type object has been selected (S120: Yes), the controller 41 goes to S130. In S130, the controller 41 controls the display 34 to, while continuing to display the currently-displayed customizing screen, additionally display a lower-layer customizing screen associated with the selected object, based on the screen data obtained in S110. Further, in S130, the controller 41 controls the display 34 to display an association-between-layers mark 80 (see FIG. 7) between the selected object and the additionally-displayed lower-layer customizing screen. The association-between-layers mark 80 represents that the selected object and the additionally-displayed lower-layer customizing screen are associated with each other. After S130, the controller 41 goes back to S120.

Suppose for instance that the third object 113 has been selected on the first customizing screen 51 shown in FIG. 6. The third object 113 is associated with the object ID "003" and the operation ID "Folder," as shown in FIG. 4. In this case, by going from S120 to S130, as shown in FIG. 7, the controller 41 controls the display 34 to display a second customizing screen 52 as a lower-layer screen associated with the third object 113, in addition to the first customizing screen 51. The second customizing screen 52 corresponds to the second screen 120 to be displayed on the display 14 of the image processing apparatus 10. Further, the controller 41 controls the display 34 to display the association-between-layers mark 80 beneath the third object 113, between the first customizing screen 51 and the second customizing screen 52.

When the information processing device 30 obtains the screen data from the image processing apparatus 10 or obtains the latest screen data stored in the storage 42, objects 121 to 123 displayed on the second customizing screen 52 are the same as the objects 121 to 123 to be displayed on the second screen 120 of the image processing apparatus 10.

Meanwhile, in response to determining that a folder-type object has not been selected (S120: No), the controller 41 goes to S140. In S140, the controller 41 determines whether a dragging operation of dragging one of the objects displayed on the main screen 50 has been started.

In response to determining that a dragging operation of dragging a target one of the objects displayed on the main screen 50 has been started (S140: Yes), the controller 41 goes to S160. In S160, the controller 41 determines whether the target object has been dragged over another object (i.e., another folder-type object) associated with the operation ID "Folder." In response to determining that the target object has not been dragged over another folder-type object (S160: No), the controller 41 goes to S180.

In S180, the controller 41 determines whether the target object has been dropped within another customizing screen. In response to determining that the target object has not been dropped within another customizing screen (S180: No), the controller 41 goes to S160. Meanwhile, in response to determining that the target object has been dropped within another customizing screen (S180: Yes), the controller 41 goes to S190.

In S190, based on the screen data obtained in S110, the controller 41 determines whether an attribute of the dropped object is acceptable to the customizing screen (hereinafter, which may be referred to as the "drop-destination customizing screen") within which the object has been dropped. Specifically, the controller 41 determines whether the attribute of the dropped object is included in an allowable attribute list of the drop-destination customizing screen. In response to determining that the attribute of the dropped object does not suit the drop-destination customizing screen, i.e., that the attribute of the dropped object is not included in the allowable attribute list of the drop-destination customizing screen (S190: No), the controller 41 determines that dropping the object within the drop-destination customizing screen is an invalid operation, and performs a particular error process in S220. Then, the controller 41 goes back to S120. Meanwhile, in response to determining that the attribute of the dropped object suits the drop-destination customizing screen, i.e., that the attribute of the dropped object is included in the allowable attribute list of the drop-destination customizing screen (S190: Yes), the controller 41 goes to S200.

In S200, based on the screen data obtained in S110, the controller 41 determines a display format for the dropped object in accordance with an object arrangement format for the drop-destination customizing screen. In S210, the controller 41 moves the dropped object onto the drop-destination customizing screen. Specifically, in S210, the controller 41 controls the display 34 to display the dropped object on the drop-destination customizing screen in the display format determined in S200 and delete the dropped object from the other customizing screen on which the dropped object was originally displayed. After S210, the controller 41 goes back to S120.

Meanwhile, in response to determining that a dragging operation of dragging one of the objects displayed on the main screen 50 has not been started (S140: No), the controller 41 goes to S145. In S145, the controller 41 determines whether the transmission button 57 has been selected. In response to determining that the transmission button 57 has not been selected (S145: No), the controller 41 goes back to S120. Meanwhile, in response to determining that the transmission button 57 has been selected (S145: Yes), the controller 41 goes to S150.

In S150, the controller 41 performs a transmission process. Specifically, the controller 41 updates the screen data obtained in S110, based on contents of each customizing screen being currently displayed on the main screen 50. Then, the controller 41 transmits the updated screen data to the image processing apparatus 10.

In response to receiving the updated screen data from the information processing device 30, the image processing apparatus 10 replaces the screen data stored therein with the received updated screen data. Thereafter, the image processing apparatus 10 causes the display 14 to display a screen based on the updated screen data.

It is noted that, in S150, the controller 41 may not necessarily transmit the whole screen data. In S150, the controller 41 may transmit at least an updated part (e.g., one or more updated records of the folder records and the object records) of the screen data.

For instance, as shown in FIG. 8, in a state where the first customizing screen 51 and the second customizing screen 52 are being displayed, suppose that the first object 121 on the second customizing screen 52 is dragged onto the first customizing screen 51 and dropped within the first customizing screen 51. In this case, the first object 121 is added to a particular position on the first customizing screen 51, and is deleted from the second customizing screen 52. Namely, the first object 121 is moved from the second customizing screen 52 onto the first customizing screen 51. Then, when the transmission button 57 is selected after the move of the first object 121, in S150, the screen data is updated in accordance with the respective contents of the customizing screens 51 and 52 after the move of the first object 121, and the updated screen data is transmitted to the image processing apparatus 10. Thereby, on the image processing apparatus 10, when the first screen 110 is displayed, the first object 121 as moved is displayed as well as the first to third objects 111 to 113.

Further, as shown in FIG. 7, in a state where the first customizing screen 51 and the second customizing screen 52 are being displayed, suppose for instance that the first object 121 on the second customizing screen 52 is selected. The first object 121 is associated with the object ID "004" and the operation ID "Folder," as shown in FIG. 4.

In this case, by going from S120 to S130, as shown in FIG. 9, the controller 41 controls the display 34 to display the third customizing screen 53 as a lower-layer screen associated with the first object 121, in addition to the first customizing screen 51 and the second customizing screen 52. The third customizing screen 53 corresponds to the third screen 130 to be displayed on the display 14 of the image processing apparatus 10. Further, the controller 41 controls the display 34 to display the association-between-layers mark 80 beneath the first object 121, between the second customizing screen 52 and the third customizing screen 53.

Thereby, it becomes possible to move objects among three customizing screens in respective different layers of the screen hierarchy. It is noted that the first and second customizing screens 51 and 52 have the same object arrangement format "horizontal arrangement" while the third customizing screen 53 has the object arrangement format "vertical arrangement." Therefore, when a target object is moved from the third customizing screen 53 onto the first customizing screen 51 or the second customizing screen 52, the target object is displayed after being converted to comply with a display format according to "horizontal arrangement," i.e., a display format with a specific icon for the target object. Conversely, when a target object is moved from the first customizing screen 51 or the second customizing screen 52 onto the third customizing screen 53, the target object is displayed after being converted to comply with a display format according to "vertical arrangement," i.e., a display format with a specific text but no icon for the target object.

In response to determining in S160 that the target object has been dragged over another folder-type object (hereinafter referred to as a "dragged-over object") (S160: Yes), the controller 41 goes to S170. In S170, the controller 41 controls the display 34 to, while continuing to display the currently-displayed customizing screen, additionally display a lower-layer customizing screen associated with the dragged-over object, based on the screen data obtained in S110. Further, in S170, the controller 41 controls the display 34 to display the association-between-layers mark 80 between the dragged-over object and the additionally-displayed lower-layer customizing screen. The association-between-layers mark 80 represents that the dragged-over object and the additionally-displayed lower-layer customizing screen are associated with each other. Following S170, the controller 41 goes back to S160.

For instance, on the main screen 50 shown in FIG. 9, suppose that the first object 131 on the third customizing screen 53 begins to be dragged, and as shown in FIG. 10, is dragged over the third object 123 on the second customizing screen 52. The third object 123 is associated with the object ID "006," the operation ID "Folder," and the operation parameter "Folder ID 004," as shown in FIG. 4.

In this case, by going from S160 to S170, as shown in FIG. 11, the controller 41 controls the display 34 to display the fourth customizing screen 54 as a lower-layer customizing screen associated with the dragged-over third object 123, instead of the third customizing screen 53. The fourth customizing screen 54 corresponds to the fourth screen (not shown) to be displayed on the display 14 of the image processing apparatus 10. Further, the controller 41 controls the display 34 to move the association-between-layers mark 80 to a position beneath the third object 123, between the second customizing screen 52 and the fourth customizing screen 54.

Thus, when a target object to be moved is dragged over another folder-type object, a lower-layer customizing screen associated with the dragged-over object may be displayed. Then, the target object being dragged may be dropped and moved onto the lower-layer customizing screen. Namely, it is possible to move an object between different customizing screens in the same layer of the screen hierarchy. It is noted that, in the example shown in FIG. 11, the third customizing screen 53 may be left displayed, and the fourth customizing screen 54 may be additionally displayed.

(5) Advantageous Effects of Illustrative Embodiment

As described above, the illustrative embodiment provides the following advantageous effects. In the illustrative embodiment, the information processing device 30 may cause the display 34 to concurrently display a plurality of customizing screens, and may move one or more objects between the plurality of customizing screens. Therefore, it is possible to easily move a target object between screens in respective different layers of the screen hierarchy.

Further, the move of the target object may be easily made by a drag-and-drop operation. Furthermore, the move of the target object may be made when an attribute of the target object is included in an allowable attribute list of the move destination screen. Thus, since the move of the target object is allowed under a particular regulation, it is possible to attain both flexibility in screen customization and user-friendliness in operating screens on the image processing apparatus 10.

On the main screen 50, when a lower-layer customizing screen associated with a currently-displayed object is additionally displayed, the association-between-layers mark 80 is displayed. Therefore, the user may easily recognize which object on a higher-layer customizing screen is associated with the additionally-displayed lower-layer customizing screen, based on the association-between-layers mark 80.

When a target object is dragged over another folder-type object, a lower-layer screen associated with the dragged-over object is displayed. Therefore, the target object may be moved between screens in the same layer of the screen hierarchy. Specifically, for instance, when a first object on a first screen in an N-th layer is dragged over a second object on a second screen in an (N−1)-th layer that is one-level higher than the first screen in the screen hierarchy, a third screen, which is associated with the dragged-over second object and is in the N-th layer, is newly displayed. Then, the first object may be dropped and placed on the newly-displayed third screen in the N-th layer.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

[Modifications]

The positions, the sizes, and the number of one or more customizing screens to be displayed on the main screen 50 may be determined appropriately as needed. A plurality of customizing screens in the same layer of the screen hierarchy may be simultaneously displayed. Information representing the association between screens in different layers of the screen hierarchy is not limited to the association-between-layers mark 80 as exemplified in the aforementioned illustrative embodiment, but may be displayed in a different fashion.

Screens customizable by the screen creating program 45 are not limited to screens to be displayed on the display 14 of the image processing apparatus 10, but may include screens to be displayed on various display apparatuses other than the image processing apparatus 10.

A plurality of functions executable by a single element exemplified in the aforementioned illustrative embodiment may be executed by a plurality of elements. Further, a single function of a single element exemplified in the aforementioned illustrative embodiment may be executed by a plurality of elements. Further, a plurality of functions of a plurality of elements exemplified in the aforementioned illustrative embodiment may be executed by a single element. Further, a single function achieved by a plurality of elements exemplified in the aforementioned illustrative embodiment may be achieved by a single element. A part of the elements and the configurations exemplified in the aforementioned illustrative embodiment may be omitted. Further, at least a part of the elements and the configurations exemplified in the aforementioned illustrative embodiment may be added to other modification according to aspects of the present disclosure, or may be replaced with elements and configurations of other modifications according to aspects of the present disclosure. Any aspects included in the technical concepts and the subject matters set forth in the following claims may be illustrative embodiments or modifications according to aspects of the present disclosure.

Associations between elements exemplified in the aforementioned illustrative embodiment and elements according to aspects of the present disclosure will be exemplified below. The storage 42 may be an example of a "non-transitory computer-readable medium" according to aspects of the present disclosure, and may be an example of a "memory" according to aspects of the present disclosure. The screen creating program 45 may be an example of "computer-readable instructions" according to aspects of the present disclosure, and may be an example of "processor-executable instructions" according to aspects of the present disclosure. The CPU 41A may be an example of a "processor" according to aspects of the present disclosure. The information processing device 30 may be an example of an "information processing device" according to aspects of the present disclosure. The display 34 may be an example of a "display" according to aspects of the present disclosure. The input I/F 35 may be an example of an "input interface" according to aspects of the present disclosure. The communication I/F 36 may be an example of a "communication interface" according to aspects of the present disclosure. The image processing apparatus 10 may be an example of a "display apparatus" according to aspects of the present disclosure. The first screen 110, the second screen 120, and the third screen 130 may be included in a "plurality of screens" to be displayed on the "display apparatus" according to aspects of the present disclosure. The association-between-layers mark 80 may be an example of "association information" according to aspects of the present disclosure. The controller 41 may be an example of a "controller" according to aspects of the present disclosure. The CPU 41A and the storage 42 may be included in the "controller" according to aspects of the present disclosure.

What is claimed is:

1. A non-transitory computer-readable medium storing computer-readable instructions that are executable by a processor coupled with an information processing device, the information processing device comprising a display, an input interface, and a communication interface configured to communicate with a display apparatus, the display apparatus having a plurality of pieces of screen data respectively representing a plurality of screens, the display apparatus being configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object, the instructions being configured to, when executed by the processor, cause the processor to:
 obtain the plurality of pieces of screen data;
 control the display to display a first customizing screen corresponding to the first screen, based on the first screen data included in the obtained plurality of pieces of screen data, the first customizing screen including one or more objects that include the particular type of object;
 in response to the particular type of object on the first customizing screen being selected via the input interface, control the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon;
 accept, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen;
 place the target object on the move-destination screen in accordance with the accepted move operation, in response to accepting the move operation via the input interface;
 update the first screen data and the second screen data, based on the move-source screen and the move-destination screen between which the target object has been moved; and
 transmit the updated first screen data and the updated second screen data to the display apparatus via the communication interface.

2. The non-transitory computer-readable medium according to claim 1,
 wherein the plurality of pieces of screen data include third screen data representing a third screen, the third screen being in a layer one-level lower than the second screen in the screen hierarchy,
 wherein the one or more objects displayed on the second screen include an object of the particular type, the object of the particular type on the second screen being configured to, when selected, cause the display apparatus to switch the screen being displayed thereon from the second screen to the third screen associated with the object of the particular type,
 wherein the one or more objects displayed on the second customizing screen include the object of the particular type,
 wherein the instructions are further configured to, when executed by the processor, cause the processor to:
  in response to the object of the particular type on the second customizing screen being selected via the input interface, control the display to display a third customizing screen corresponding to the third screen, based on third screen data included in the obtained plurality of pieces of screen data, in addition to the first customizing screen and the second customizing screen, the third customizing screen being associated with the object of the particular type selected on the second customizing screen, the third customizing screen including one or more objects displayed thereon, and
 wherein the move-source screen is one of the first customizing screen, the second customizing screen, and the third customizing screen, and the move-destination screen is another one of the first customizing screen, the second customizing screen, and the third customizing screen.

3. The non-transitory computer-readable medium according to claim 1,
 wherein each individual object included in each of the plurality of screens has a specific attribute set therefor among a plurality of different attributes,
 wherein each of the plurality of screens has one or more allowable attributes set therefor among a plurality of different attributes, and
 wherein the instructions are further configured to, when executed by the processor, cause the processor to:
  determine whether the specific attribute set for the target object is included in the one or more allowable attributes set for the move-destination screen, in response to accepting the move operation via the input interface;
  place the target object on the move-destination screen in accordance with the accepted move operation, in response to determining that the specific attribute set for the target object is included in the one or more allowable attributes set for the move-destination screen.

4. The non-transitory computer-readable medium according to claim 3,
 wherein the instructions are further configured to, when executed by the processor, cause the processor to:
  perform a particular error process in response to determining that the specific attribute set for the target object is not included in the one or more allowable attributes set for the move-destination screen.

5. The non-transitory computer-readable medium according to claim 1,
 wherein the first customizing screen is a higher-layer screen, and the second customizing screen is a lower-layer screen in a layer one-level lower than the higher-layer screen in the screen hierarchy, and wherein the instructions are further configured to, when executed by the processor, cause the processor to:
control the display to display the lower-layer screen in addition to the higher-layer screen in response to the particular type of object on the higher-layer screen being selected via the input interface; and
control the display to display association information representing that the lower-layer screen is associated with the particular type of object selected on the higher-layer screen, in response to the lower-layer screen being displayed in addition to the higher-layer screen.

6. The non-transitory computer-readable medium according to claim 1,
wherein each of the plurality of screens is configured to display each individual object included therein in one of display formats including:
an icon format in which each individual object is displayed with a specific icon associated therewith; and
a text format in which each individual object is displayed with a specific text associated therewith, and
wherein the instructions are further configured to, when executed by the processor, cause the processor to:
determine a display format for the target object in accordance with whether the display format for the move-destination screen is different from the display format for the move-source screen, in response to accepting the move operation via the input interface; and
control the display to display, in the determined display format, the target object placed on the move-destination screen in accordance with the accepted move operation.

7. The non-transitory computer-readable medium according to claim 1,
wherein the instructions are further configured to, when executed by the processor, cause the processor to:
accept, via the input interface, the move operation of moving the target object from the move-source screen onto the move-destination screen, the move operation including dragging and dropping the target object;
move a display position of the target object on the display in response to the target object being dragged onto the move-destination screen in the accepted move operation;
complete placing the target object on the move-destination screen in response to the target object being dropped on the move-destination screen in the accepted move operation;
in response to the target object being dragged over an object of the particular type displayed on the move-destination screen, control the display to display a lower-layer screen associated with the object of the particular type, the lower-layer screen being in a layer one-level lower than the move-destination screen in the screen hierarchy; and
place the target object on the lower-layer screen in response to the target object being dropped on the lower-layer screen.

8. An information processing device comprising:
a display;
an input interface;
a communication interface configured to communicate with a display apparatus, the display apparatus having a plurality of pieces of screen data respectively representing a plurality of screens, the display apparatus being configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object; and
a controller configured to perform a control process comprising:
obtaining the plurality of pieces of screen data;
controlling the display to display a first customizing screen corresponding to the first screen, based on the first screen data included in the obtained plurality of pieces of screen data, the first customizing screen including one or more objects that include the particular type of object;
in response to the particular type of object on the first customizing screen being selected via the input interface, controlling the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon;
accepting, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen;
placing the target object on the move-destination screen in accordance with the accepted move operation, in response to accepting the move operation via the input interface;
updating the first screen data and the second screen data, based on the move-source screen and the move-destination screen between which the target object has been moved; and
transmitting the updated first screen data and the updated second screen data to the display apparatus via the communication interface.

9. The information processing device according to claim 8,
wherein the controller comprises:
a processor; and
a memory storing processor-executable instructions configured to, when executed by the processor, cause the processor to perform the control process.

10. A method implementable on a processor coupled with an information processing device, the information processing device comprising a display, an input interface, and a communication interface configured to communicate with a display apparatus, the display apparatus having a plurality of pieces of screen data respectively representing a plurality of screens, the display apparatus being configured to display each individual screen based on a corresponding one of the plurality of pieces of screen data, the plurality of pieces of screen data including first screen data representing a first screen and second screen data representing a second screen, the second screen being in a layer one-level lower than the first screen in a screen hierarchy, each screen including one or more objects displayed thereon, the one or more objects displayed on the first screen including a particular type of object, the particular type of object on the first screen being configured to, when selected, cause the display apparatus to switch a screen being displayed thereon from the first screen to the second screen associated with the particular type of object, the method comprising:

obtaining the plurality of pieces of screen data;

controlling the display to display a first customizing screen corresponding to the first screen, based on the first screen data included in the obtained plurality of pieces of screen data, the first customizing screen including one or more objects that include the particular type of object;

in response to the particular type of object on the first customizing screen being selected via the input interface, controlling the display to display a second customizing screen corresponding to the second screen, based on the second screen data included in the obtained plurality of pieces of screen data, in addition to the first customizing screen, the second customizing screen being associated with the particular type of object selected on the first customizing screen, the second customizing screen including one or more objects displayed thereon;

accepting, via the input interface, a move operation of moving a target one of the one or more objects displayed on a move-source screen onto a move-destination screen, the move-source screen being one of the first customizing screen and the second customizing screen, the move-destination screen being another one of the first customizing screen and the second customizing screen;

placing the target object on the move-destination screen in accordance with the accepted move operation, in response to accepting the move operation via the input interface;

updating the first screen data and the second screen data, based on the move-source screen and the move-destination screen between which the target object has been moved; and transmitting the updated first screen data and the updated second screen data to the display apparatus via the communication interface.

* * * * *